Patented July 4, 1944

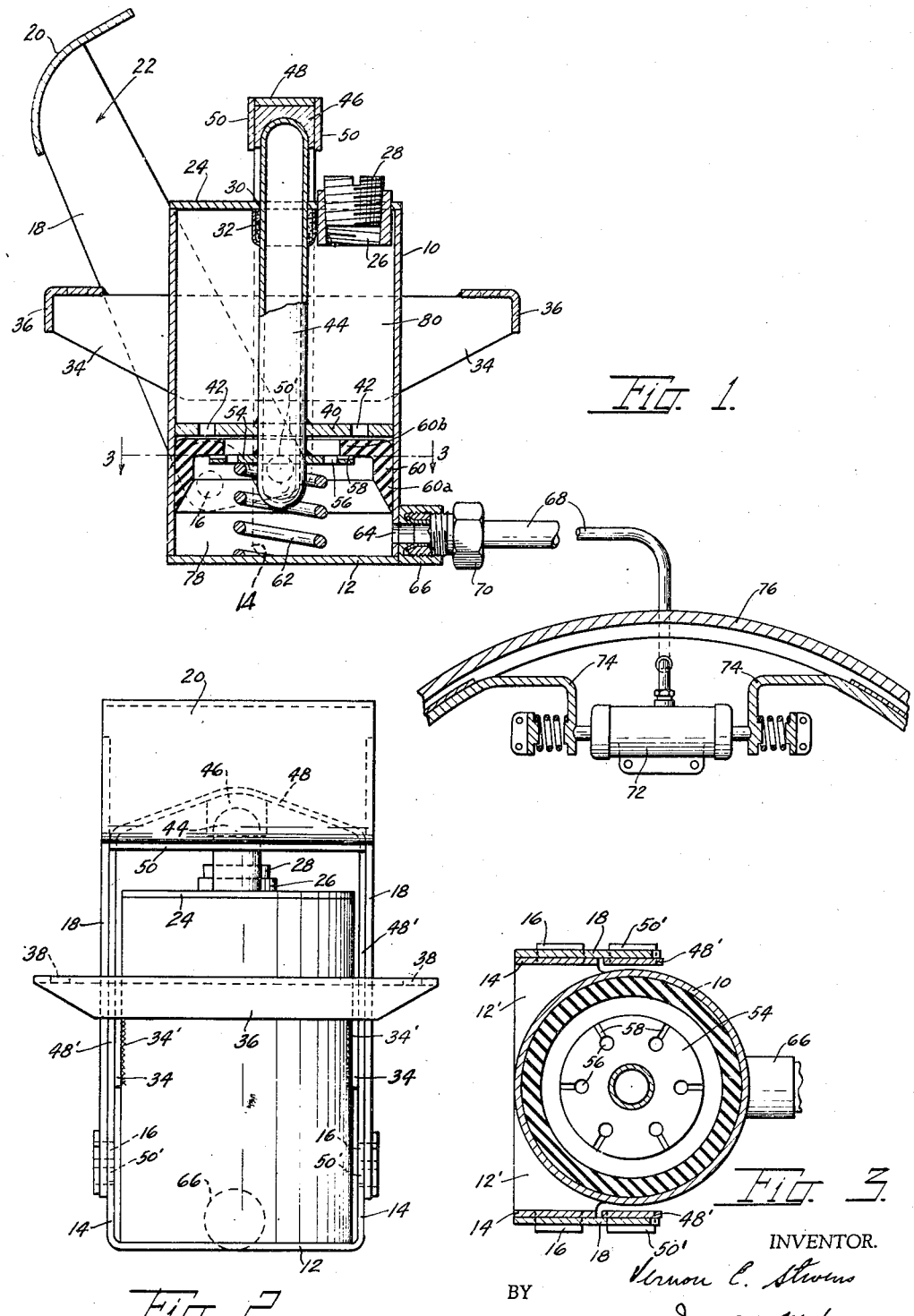

2,352,920

UNITED STATES PATENT OFFICE 2,352,920

FLUID ACTUATED BRAKE

Vernon E. Stevens, Wellsville, N. Y.

Application January 17, 1941, Serial No. 374,794

7 Claims. (Cl. 60—54.6)

The present invention relates to fluid actuated brakes and has particular reference to the brake actuating mechanism inclusive of the actuating cylinder and reservoir for operating fluid, commonly referred to in fluid actuated braking systems as the master cylinder.

Among the several objects of the invention are; to provide improved master cylinder structure in which the actuating cylinder and reservoir are combined in a manner eliminating all separating partitions, cylinder ports, and the like of the kind ordinarily employed in prior structures; to provide an improved master cylinder unit in which the actuating cylinder, the reservoir and actuating or brake applying pedal are incorporated in a single unit structure; to provide an improved master cylinder construction which may be incorporated with the remainder of the braking system to provide a complete fluid system which is inherently and automatically self-bleeding to thereby eliminate the necessity for bleed cocks or the like of the kind required for prior systems; to provide an improved master cylinder unit the construction of which enables the fluid system to be hermetically sealed and to thereby eliminate the possibility of any leakage from the system; to provide an improved master cylinder structure, the construction of which permits the fluid system to be moved into any position without interfering with subsequent proper functioning of the system in its normal position when its use is required, thereby making the system applicable for installation in aircraft which may assume various abnormal positions during the time intervals between the times when actuation of the braking system is required; to provide an improved master cylinder structure which is capable of being used either individually to actuate one or more brakes or in conjunction, as in series, with one or more additional master cylinders of like construction, without the necessity for the use of check valves or the like between the different master cylinders in the same system; and to provide an improved master cylinder construction of unit nature which is extremely light and compact and also simple and rugged in construction and adaptable for use on any type of vehicle or other structure requiring braking but particularly adaptable for application to aircraft.

The manner in which the above noted objects and other and more detailed objects which will hereinafter be pointed out are attained will best be understood from a consideration of the ensuing portion of this specification, which, taken in conjunction with the accompanying drawing, describes and illustrates one suitable form of construction for carrying the invention into effect.

In the drawing:

Fig. 1 is a central lonigtudinal section of a master brake cylinder unit embodying the invention, the figure also showing on a smaller scale in connection with the unit a brake shoe operating cylinder;

Fig. 2 is an elevation looking from the left of Fig. 1; and

Fig. 3 is a section taken on the line 3—3 of Fig. 1.

Referring now more particularly to Fig. 1, the master cylinder is indicated at 10. This cylinder is advantageously made as in the embodiment shown, of sheet metal, which may be steel, brass, or light weight alloy, depending upon the circumstances in the individual case.

At its lower end, the cylinder is closed by a bottom plate 12 brazed or welded to the lower end of the cylinder. The bottom plate 12 is provided with portions 12' which project beyond the perimeter of the cylinder, the portions 12' being bent upwardly at their ends to provide vertically extending tabs 14. Tabs 14 provide pivots 16 for pivotally mounting the two side arms 18, advantageously formed of sheet metal, which at their upper ends are connected by the sheet metal plate 20 to form the actuating pedal designated generally at 22.

The top of the cylinder 10 is closed by a cover plate 24, preferably of sheet metal, having a filling opening 26 formed therein which is closed by a plug 28, which after assembly may if desired be hermetically sealed in place by any suitable means. The plate 24 has a centrally located aperture 30 and around this opening there is provided in any suitable manner a packing box or gland 32 located interiorly of the cylinder and permanently fixed to the cover plate. The cover plate 24 is preferably brazed or welded to the cylinder to form a permanent fluid-tight joint between these parts.

A pair of parallel mounting bracket plates 34 are brazed or welded as at 34' to the cylinder 10 at opposite sides thereof and the ends of these bracket arms are joined by mounting plates 36 of angle section. Mounting plates 36 are suitably apertured as at 38 to provide for securing the unit to the structure upon which it is to be mounted.

Located within the cylinder 10 is a piston backing plate 40 having a sliding fit within the cylinder and provided with a series of openings 42, preferably located on a circle concentric with the cylinder wall. Plate 40 is brazed or welded to a piston rod 44 which advantageously is hollow for the sake of lightness and which passes through the stuffing box 32 to the exterior of the cylinder. The exterior end of the rod 44 is hemispherical and seats in a suitable hemispherical socket in a block 46 fixed beneath the upper portion of a strap 48 and between two side straps 50. Strap 48 is formed as a yoke, the arms 48' of which extend downwardly along the sides of the cylinder 10. At their lower ends these arms are pivotally attached at 50' to the side arms 18 of the pedal 22.

Adjacent to the lower end of the piston rod 44 and below the backing plate 40, an auxiliary plate 54 is fixed to the rod 44. Plate 54 is substantially smaller in diameter than the cylinder 10 and is provided with a series of openings or ports 56 preferably arranged in a circle as shown in Fig. 3 of the drawing. On the upper face of the plate 54 a series of shallow grooves 58 is provided, there being one such groove associated with each port opening 56 and the grooves providing a connection on the upper surface of the plate between the ports and the perimeter of the plate. These grooves are preferably arranged radially as shown in Fig. 3.

Between the backing plate 40 and the auxiliary plate 54 there is located the piston or plunger 60, in the form of an annular cup having a cylinder wall engaging portion 60a and portion 60b extending radially inwardly between the plates 40 and 54 and acting in conjunction therewith as a valve. Piston 60 is preferably of a suitable non-metallic material such as leather, rubber, neoprene or the like, chosen with due regard for the characteristics of the operating fluid to be used in the cylinder. The inner diameter of the portion 60b is such that this portion can cover the ports 42 in the backing plate while leaving the ports 56 in the auxiliary plate uncovered at all times. The thickness of portion 60b of the plunger is somewhat less than the distance between the plates 40 and 54, to permit some axial play and allow the plunger to move away from the backing plate by a limited amount.

The lower face of the auxiliary plate 54 forms an abutment for one end of a spring 62 which is compressed between this plate and the bottom plate of the cylinder. As will be observed from Figs. 1 and 2, the mounting plates 36 extend outwardly beyond the planes of the side arms 18 of the operating pedal and form stops against which these arms abut under the influence of the spring 62, which operates to retract the pedal. As will be seen from Fig. 1, the spring 62, acting constantly to tend to lift the piston and piston rod assembly, keeps the upper end of the rod 44 in constant compression contact with the socket 46. Consequently, no further mechanical connection between these parts is required and the hemispherical contact surfaces enable the yoke formed by strap 48 to swing with respect to the rod 44 by the amount required to compensate for the arcuate paths of travel of the pivot points 50' at the bottom of the yoke.

In the lower part of the cylinder 10 there is provided an opening 64 and around this opening there is fixed to the exterior of the cylinder by brazing or welding a connector 66 to which the pressure pipe 68 leading to the brake operating cylinder is attached in any desired manner, preferably by a releasable compression coupling of known form indicated generally at 70. The pressure pipe 68 leads to the brake operating cylinder 72 which may be of conventional form, for applying the brake shoes indicated at 74 to the brake drum 76.

As will be observed from Fig. 1, the normal position of the piston 60 and its associated plates is such that the interior of the cylinder 10 is divided by the piston assembly into an actuating or pressure cylinder 78 below the piston and a reservoir space 80 above the piston.

The operation of the device is as follows, it being assumed that the fluid system inclusive of the reservoir space 80 is filled with a suitable brake operating fluid which may be any one of a number of commercially available kinds. The parts are shown in the figure in the normal position which they assume after each actuation of the brake and in which they are ready for the next application. In this position, the portion 60b of the piston 60 is in contact with the upper face of plate 54 and away from the lower face of the backing plate 40. The reason for this is due to the fact that after a previous actuation the parts have been returned to the position shown by the action of spring 62 moving the piston assembly upwardly, with plate 54 acting as the abutment for moving the piston 60 upwardly against the friction between the portion 60a and the cylinder wall.

Upon application of the brake by foot or other pressure tending to move the pedal 22 to the right as viewed in Fig. 1, the initial movement serves to push plate 40 downwardly into contact with the upper face of the piston, the portion 60b of the piston sealing the ports 42 in the backing plate and providing the required closing or valve effect necessary to the creation of the desired fluid pressure in the actuating cylinder 78 below the piston. Continued movement of the pedal thereafter operates to increase the pressure in the actuating cylinder and causes the brake operating cylinder 72 to be actuated in the usual manner.

Upon release of braking pressure from the pedal, spring 62 acts to return the pedal to its normal position of rest and causes the piston rod and plate structure to move relative to the piston so as to shift the latter into contact with the upper face of plate 54. This operates to open the valve ports 42 in the backing plate, thus permitting flow of the brake fluid from the reservoir chamber 80 through ports 42 and 56 into the actuating cylinder 78, so as to maintain the latter filled with fluid.

The normal position for mounting the master cylinder is in generally upright position, preferably but not necessarily with the cylinder vertical, and as will be observed from the drawing the pressure system is self-bleeding with respect to any air or vapor therein, which has a free path of flow to the upper part of the reservoir. In order to allow for expansion of the brake fluid without operating the brake, some expansion space must be left in the reservoir, which may result in air or vapor finding its way into the pressure system if the device is kept in an inverted or other abnormal position for any material length of time, as may be the case with an airplane braking system. However, as soon as a normal position is resumed (which must be done before there can be any need for brakes) the pressure system automatically clears itself of any air or vapor through the ports 56, grooves 58 and ports 42, all of which are constantly open except when the brake is applied. Since the pressure cylinder 78 is thus completely filled with operating fluid, only a negligible initial pedal movement from the stop position is required to shift the backing plate 40 into contact with piston 60 to close the valve ports 42 and commence the creation of braking pressure.

Insofar as the nature of the braking system embodying the principles of the invention is concerned it will be apparent that a single master cylinder unit may be employed to actuate a plurality of brake operating cylinders, by suitably arranging a multiple pressure pipe system. It is, however, to be noted that owing to the very light and compact nature of the device, as well as its relatively low cost, it is particularly advantageous for use in aircraft where separate control of individual wheel brakes is desired for ground manoeuvring of the craft, which requires a separate master cylinder for each brake operating cylinder.

It is further to be noted that the master cylinder unit is very well adapted for use in installations requiring two or more master cylinders to be connected to actuate the same brake cylinder or set of brake cylinders, as for example in the case of dual controls for aircraft, each set of which is located in such manner with respect to the other as to make the mechanical interconnection between two pedals for operating the same master cylinder impractical or undesirable. With the present device such a multiple master cylinder arrangement can readily be made without resort to check valves or the like in the piping system between the cylinders, which valves are undesirable becouse of the possibility of their forming pockets in which air or vapor may be trapped in the pressure lines. The reason why check valves are unnecessary in such a system will be apparent from Fig. 1, from which it will be observed that with the unit in repose, the plate 40 is at the upper limit of its travel because of the abutment of the pedal against its stop. Consequently, if pressure is created in the line 68 and chamber 78 due to actuation of another master cylinder connected to line 68, this pressure, below piston 60, operates to lift the piston the small amount necessary to close ports 42 and prevent backflow into chamber 80.

The present invention is not limited to the construction herein described and illustrated by way of example, and may be varied in many ways, as for instance by the use of die cast parts or other changes in design. It is accordingly to be understood as embracing all forms of construction falling within the scope of the appended claims.

What is claimed is:

1. For use in fluid actuated brake systems, a master cylinder unit comprising a cylinder, a piston assembly located in said cylinder and separating the interior thereof into a pressure chamber and a reservoir chamber for operating fluid, said piston assembly comprising a ported backing plate, an annular piston engaging said cylinder on the pressure chamber side of said plate, said piston having a portion located to cover the ports in said plate, an auxiliary plate located on the side of said piston opposite that of the first mentioned plate, said plates being fixed relative to each other and said piston having limited movement between said plates to permit it to open and close the ports in said backing plate, means providing for flow of fluid past said auxiliary plate independently of the position of the piston relative to the auxiliary plate, and means operative from the reservoir chamber end of the cylinder for moving said plates.

2. For use in fluid actuated brake systems, a master cylinder unit comprising a cylinder, a piston assembly located in said cylinder and separating the interior thereof into a pressure chamber and a reservoir chamber for operating fluid, said piston assembly comprising a ported backing plate, an annular piston engaging said cylinder on the pressure chamber side of said plate, said piston having a portion located to cover the ports in said plate, an auxiliary plate located on the side of said piston opposite that of the first mentioned plate, said plates being fixed relative to each other and said piston having limited movement between said plates to permit it to open and close the ports in said backing plate, means providing for flow of fluid past said auxiliary plate independently of the position of the piston relative to the auxiliary plate, means operative from the reservoir chamber end of the cylinder for moving said plates, and spring means located in said pressure chamber and acting on a portion of said piston assembly other than said piston for moving said assembly toward the reservoir end of said cylinder.

3. For use in fluid actuated brake systems, a master cylinder unit comprising a cylinder, a piston assembly located in said cylinder and separating the interior thereof into a pressure chamber and a reservoir chamber for operating fluid, said cylinder being adapted to be located in generally upright position with the reservoir chamber above the pressure chamber, said piston assembly comprising a backing plate having a series of ports therein, an auxiliary plate located below and fixedly spaced from said backing plate, a cup-shaped piston having a portion engaging the cylinder wall below said backing plate and an inwardly extending portion located between said plates and shaped to overlie the ports in said backing plate, said piston having limited axial play between said plates, said auxiliary plate having means formed therein providing for flow of fluid past the plate independently of the position of the piston relative thereto, a spring located in said pressure chamber and acting to move said plates toward the reservoir end of said cylinder, and actuating means operable from the exterior of the reservoir end of the cylinder for moving said piston assembly toward the pressure chamber end of the cylinder against the action of said spring.

4. For use in fluid actuated brake systems, a master cylinder unit comprising a cylinder, a piston assembly located in said cylinder and separating the interior thereof into a pressure chamber and a reservoir chamber for operating fluid, said cylinder being adapted to be located in generally upright position with the reservoir chamber above the pressure chamber, said piston assembly comprising a backing plate slidably mounted in said cylinder and having a ring of port openings therein spaced from the wall of the cylinder, an auxiliary plate fixed relative to said backing plate and located in spaced relation below the backing plate, and an annular cup-shaped piston having a portion engaging the wall of the cylinder and a portion extending radially inwardly from the cylinder wall between said plates, said auxiliary plate having a ring of openings therethrough located on a smaller radius than the openings in said backing plate, the inwardly extending portion of said piston extending radially inwardly to an extent such as to radially overlie the ports in the backing plate but not the ports in the auxiliary plate and said inwardly extending portion having limited axial movement between said plates, a spring located in the pressure chamber for moving said plates toward the reservoir end of said cylinder, and means operable from the exterior of the reservoir end of the cylinder for moving said plates toward the pressure chamber end of the cylinder.

5. For use in fluid actuated brake systems, a master cylinder unit comprising a cylinder, a piston assembly located in said cylinder and separating the interior thereof into a pressure chamber and a reservoir chamber for operating fluid, said cylinder being adapted to be located in generally upright position with the reservoir chamber above the pressure chamber, said piston assembly comprising a backing plate slidably mounted in said cylinder and having a ring of port openings therein spaced from the wall of the cylinder, an auxiliary plate fixed relative to said backing plate and located in spaced relation below the backing plate, and an annular cup-shaped piston having a portion engaging the wall of the cylinder and a portion extending radially inwardly from the cylinder wall between said plates, said auxiliary plate having a ring of openings therethrough located on a smaller radius than the openings in said backing plate, the inwardly extending portion of said piston extending radially inwardly to an extent such as to radially overlie the ports in the backing plate but not the ports in the auxiliary plate, and said inwardly extending portion having limited axial movement between said plates, the upper face of said auxiliary plate being recessed to provide passages for flow of fluid between the perimeter of the plate and the space between the auxiliary plate and the backing plate independently of the position of the piston relative to the auxiliary plate, a spring located in the pressure chamber for moving said plates toward the reservoir end of said cylinder, and means operable from the exterior of the reservoir end of the cylinder for moving said plates toward the pressure chamber end of the cylinder.

6. For use in fluid actuated brake systems, a master cylinder unit comprising a cylinder, a piston assembly mounted in said cylinder and dividing the interior thereof into a pressure chamber and a reservoir chamber, a piston rod extending from said piston assembly through the reservoir end of the cylinder, an actuating member pivotally mounted with respect to the cylinder, a yoke member engaging the projecting rod, said yoke member being capable of turning movement relative to said piston rod, and the ends of said yoke member being pivotally attached to said actuating member, means associated with said cylinder and providing a stop for limiting the movement of said actuating member and determining the fully retracted position thereof, and a spring acting on said piston assembly and tending to move said actuating member toward its retracted position through said piston rod and said yoke, said spring maintaining the said piston rod in compression between the spring and said yoke.

7. For use in fluid actuated brake systems, a master cylinder unit comprising a cylinder, mounting brackets secured to said cylinder for mounting the same in substantially upright position, a piston assembly located in the cylinder for dividing the interior of the same into a reservoir chamber above the assembly and a pressure chamber below the assembly, a piston rod secured to said piston assembly and projecting upwardly through the reservoir chamber end of the cylinder, an inverted yoke member having a socket engaging the projecting end of said piston rod to permit movement of the yoke relative to the piston rod and having arms extending downwardly along opposite sides of said cylinder, an actuating member, said actuating member having arms located on opposite sides of the cylinder and pivotally mounted with respect thereto adjacent to the lower end of the cylinder, pivot connections between each of the side arms of the actuating member and the arms of the yoke member respectively, a stop associated with said cylinder and arranged to be engaged by said actuating member to determine the fully retracted position thereof, said pivot connections being arranged so that upward movement of the piston rod against the yoke tends to move the actuating member toward said stop and a spring located in said pressure chamber and acting on said piston assembly in a direction tending to move it upwardly.

VERNON E. STEVENS.